(12) United States Patent
Rosenberg et al.

(10) Patent No.: US 9,311,633 B2
(45) Date of Patent: Apr. 12, 2016

(54) DIGITAL FILE PROCESSING FOR SECONDARY SALE

(76) Inventors: David Rosenberg, Manhattan Beach, CA (US); Medhanie Estiphanos, Chula Vista, CA (US); Gokul Kumar Kolandavel, Burbank, CA (US)

(*) Notice: Subject to any disclaimer, the term of this patent is extended or adjusted under 35 U.S.C. 154(b) by 2218 days.

(21) Appl. No.: 12/141,768

(22) Filed: Jun. 18, 2008

(65) Prior Publication Data

US 2008/0319867 A1 Dec. 25, 2008

Related U.S. Application Data

(60) Provisional application No. 60/945,861, filed on Jun. 22, 2007.

(51) Int. Cl.
| | | |
|---|---|---|
| G06Q 20/00 | (2012.01) | |
| G06Q 20/12 | (2012.01) | |
| G06Q 30/06 | (2012.01) | |
| G06Q 30/00 | (2012.01) | |
| G06F 21/10 | (2013.01) | |

(52) U.S. Cl.
CPC ............ *G06Q 20/1235* (2013.01); *G06Q 20/12* (2013.01); *G06Q 30/00* (2013.01); *G06Q 30/06* (2013.01); *G06Q 30/0613* (2013.01); *G06F 21/10* (2013.01); *G06F 2221/2143* (2013.01); *G06Q 2220/10* (2013.01); *G06Q 2220/16* (2013.01)

(58) Field of Classification Search
CPC ... G06Q 40/12; G06Q 10/087; G06Q 20/105; G06Q 20/367; G06Q 20/3674; G06Q 20/401; G06Q 30/0185; G06Q 50/24; G06Q 20/1235; G06F 3/065; G06F 21/10; G06F 3/067; G06F 3/0613; G06F 3/0647; G06F 17/30221; G06F 2206/1012; G06F 17/30067; G06F 11/1435; G06F 17/30312; G06F 11/1469; G06F 17/30079

See application file for complete search history.

(56) References Cited

U.S. PATENT DOCUMENTS

| | | | | |
|---|---|---|---|---|
| 6,901,413 | B1* | 5/2005 | Wu | 707/692 |
| 2002/0168082 | A1* | 11/2002 | Razdan | 382/100 |
| 2005/0131902 | A1* | 6/2005 | Saika | 707/10 |
| 2006/0010075 | A1* | 1/2006 | Wolf | 705/57 |
| 2006/0156382 | A1* | 7/2006 | Motoyama | G06F 21/6209 726/1 |
| 2007/0162753 | A1* | 7/2007 | Nakano et al. | 713/171 |
| 2008/0065911 | A1* | 3/2008 | Elazar et al. | 713/194 |
| 2008/0208963 | A1* | 8/2008 | Eyal et al. | 709/203 |
| 2008/0294531 | A1* | 11/2008 | Nassimi | 705/26 |

OTHER PUBLICATIONS http://www.guidebookgallery.org/apps/itunes/help ; GUIdebook> . . . >iTunes>Help ; itunes help ; pp. 1-4.
Hansen, Evan; "eBay mutes iTunes sony auction" Sep. 5, 2003 ; http://news.cnet.com/2100-1027_3-5071566.html ; p. 1-3.

* cited by examiner

*Primary Examiner* — Calvin L Hewitt, II
*Assistant Examiner* — Mohammad A Nilforoush
(74) *Attorney, Agent, or Firm* — Fountainhead Law Group P.C.

(57) ABSTRACT

In one embodiment, a method for transferring digital files is provided. The method includes: downloading an application for facilitating the transfer of used digital files; storing the application at the client; receiving an indication of a used digital file that a user desires to sell; searching, using the application, storage on the client to determine any instances of the digital file; deleting any instances of the digital file if they are determined; transferring a forwarded file of the used digital file to a second entity; and deleting, using the application, the used digital file from the client upon transfer of the forwarded file.

19 Claims, 4 Drawing Sheets

DIGITAL FILE PROCESSING FOR SECONDARY SALE

This application claims priority from U.S. Provisional Patent Application Ser. No. 60/945,861, entitled DIGITAL FILE PROCESSING FOR SECONDARY SALE, filed on Jun. 22, 2007, which is hereby incorporated by reference as if set forth in full in this application for all purposes.

BACKGROUND

Particular embodiments generally relate to processing of digital files.

Users can purchase digital files from sellers. For example, marketplaces, such as iTunes™ and Napster™, allow a user to purchase a digital file, such as a song or video. A digital file is downloaded and stored on a user's client computer. The user then owns the digital file.

However, unlike other items that are purchased, such as books, CDs, etc., users are restricted from selling a used copy of the digital file. One reason is because copyright holders may put restrictions on resale. Thus, even if a user becomes unhappy with or not interested in a digital file, the user has no recourse to recoup some of the investment that was spent in purchasing the digital file.

SUMMARY

In one embodiment, a method for transferring digital files is provided. The method includes: downloading an application for facilitating the transfer of digital files; storing the application at the client; receiving an indication of a digital file that a user desires to sell; searching, using the application, storage on the client to determine any instances of the digital file; deleting any instances of the digital file if they are determined; transferring a forwarded file of the used digital file to a second entity; and deleting, using the application, the digital file from the client upon transfer of the forwarded file.

A further understanding of the nature and the advantages of particular embodiments disclosed herein may be realized by reference of the remaining portions of the specification and the attached drawings.

DETAILED DESCRIPTION OF EMBODIMENTS

Figure 1:
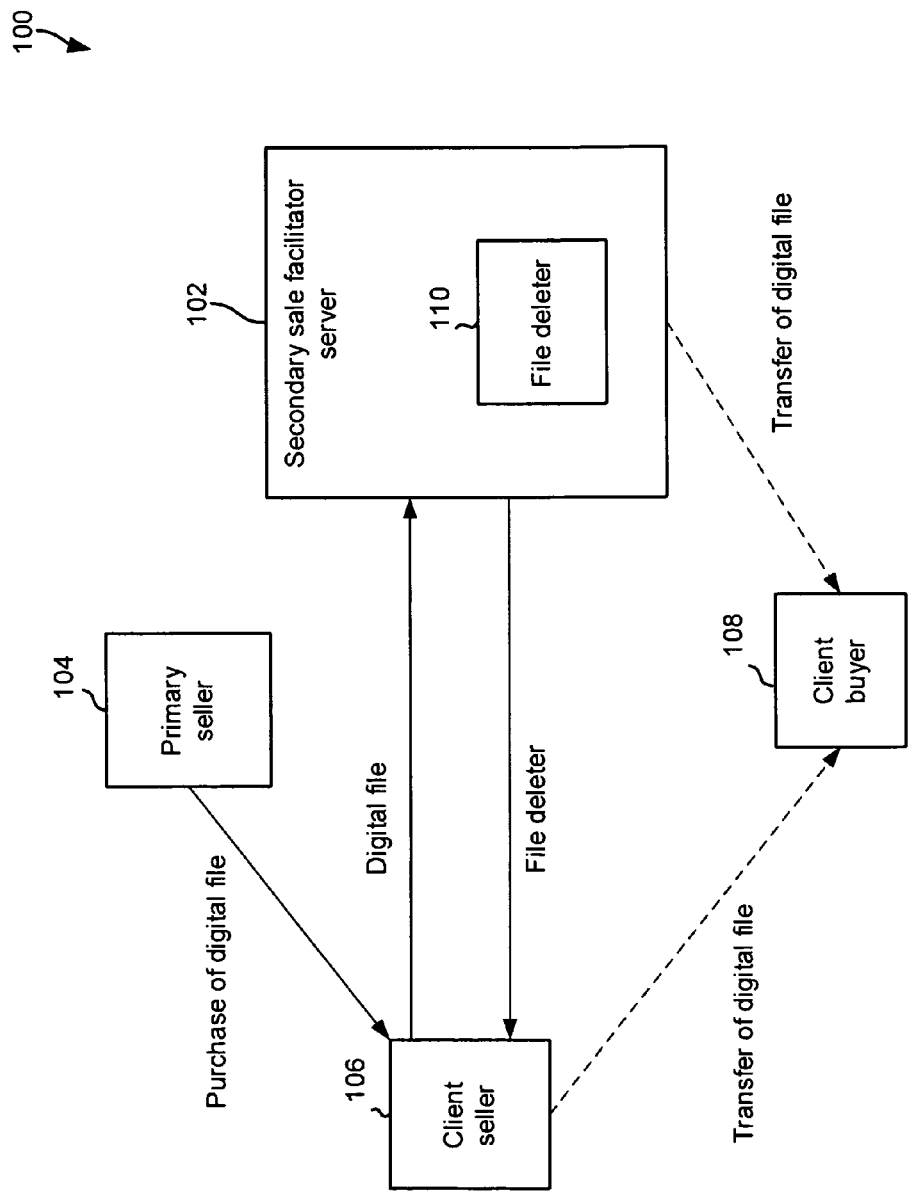
FIG. 1 shows an example of a system for providing the buying, selling, and/or trading of used digital files.

FIG. 1 shows an example of a system 100 for providing the buying, selling, and/or trading of used digital files. System 100 includes a secondary sale facilitator 102, a primary seller 104, a client seller 106, and a client buyer 108.

Primary seller 104 may be the primary seller of a digital file. For example, primary seller 104 may be an entity that sells a new digital file. Sale of a new digital file may be considered an original sale. For example, an original sale may be when a digital file has not been purchased before the sale to client seller 106. Examples of an original sale include purchasing a digital song from an internet marketplace, purchasing a digital movie from a distributor, downloading a streaming video, etc.

A digital file may be any digital information that is included in the file. For example, the digital file may include music, video, a song, a movie, a television show, video games, electronic books, software programs, etc. The digital file may be subject to copyright protection. For example, certain aspects of information found in the digital file are protected by copyright law. Although primary seller 104 is shown as a separate entity from secondary sale facilitator 102, it will be understood that secondary sale facilitator 102 and primary seller 104 may be under control of the same entity.

Client seller 106 may be a primary purchaser of the digital file from primary seller 104. For example, a user may purchase the digital file from an Internet marketplace. In one example, client seller 106 purchases a digital file at retail price. This may be considered a new purchase. Once purchasing the new digital file, client seller 106 may want to resell or trade the digital file.

Secondary sale facilitator server 102 is configured to facilitate the transfer of the used digital file. The transfer may be part of a sale, trade, barter, or other transaction. As will be described in more detail below, secondary sale facilitator 102 is configured to provide a mechanism in which the digital file is transferred to client buyer 108 in addition to deleting any instances of the digital file found on client seller 106. For example, an application may be used to search for and delete any instances of the digital file that is being transferred. Further, secondary sale facilitator 108 may facilitate the transfer of the digital file.

Client seller 106 and client buyer 108 may include an application found on a client computer. For example, a client computer may be a laptop computer, personal computer, set top box, personal digital assistant (PDA), cellular phone, etc. In one embodiment, client seller 106 and client buyer 108 communicate using a web browser with primary seller 104 and secondary sale facilitator 102. Also, in one embodiment, primary seller 104 and secondary sale facilitator may include an application included on a web server.

Client seller 106 may not be able to resell the digital file purchased from primary seller 104. The digital file is transferred from primary seller 104 to client seller 106 through a digital medium, such as the Internet. The digital file is not stored in a tangible medium when it is purchased from primary seller 104. For example, an analog or digital version of the digital file would conventionally be stored on a compact disc (CD). This allows a content owner of the CD to police the resale of the CD because the CD is tangible and cannot be copied because of digital rights management. Thus, if the CD is sold, the user is not keeping an authorized copy of the CD because the contents could not have been copied from the CD. Thus, the contents cannot be redistributed to others for profit. However, the digital file is electronically transmitted to client seller 106. Client seller 106 can then store the file in storage, such as in the hard drive of a laptop computer. Because multiple instances of the digital file may be made, it may not be legal based on a copyright holder's restrictions for client seller 106 to sell the digital file while maintaining a copy in storage. Accordingly, particular embodiments provide a mechanism in which the buying, selling, and trading of digital files can be performed. Further, a marketplace is provided in which client sellers 106 and client buyers 108 may interact to facilitate the buying, selling, and trading of digital files.

In one embodiment, a file deleter 110 may be downloaded by client seller 106. In other embodiments, file deleter 110 may be resident on a computing device for client seller 106.

For example, a program may be included on a computer when purchased or may be part of an Internet browser.

File deleter 110 may facilitate transfer of the digital file to client buyer 108. The digital file may be transferred either through secondary sale facilitator 102 to client buyer 108 or directly from client seller 106 to client buyer 108. The transfer may be through a network, such as the Internet, a WiFi network, a wired network, etc.

File deleter 110 may search client seller 106 to determine if any instances are found in storage. If any instances are found, these instances are deleted. File deleter 110 then facilitates transfer of the digital file to client buyer 108. Additionally, after facilitating the transfer, either to secondary sale facilitator 102 or directly to each client buyer 108, file deleter 110 deletes the digital file from client seller 106. Accordingly, file deleter 110 may reasonably ensure that no instances of the digital file reside on storage of client seller 106.

Figure 2:
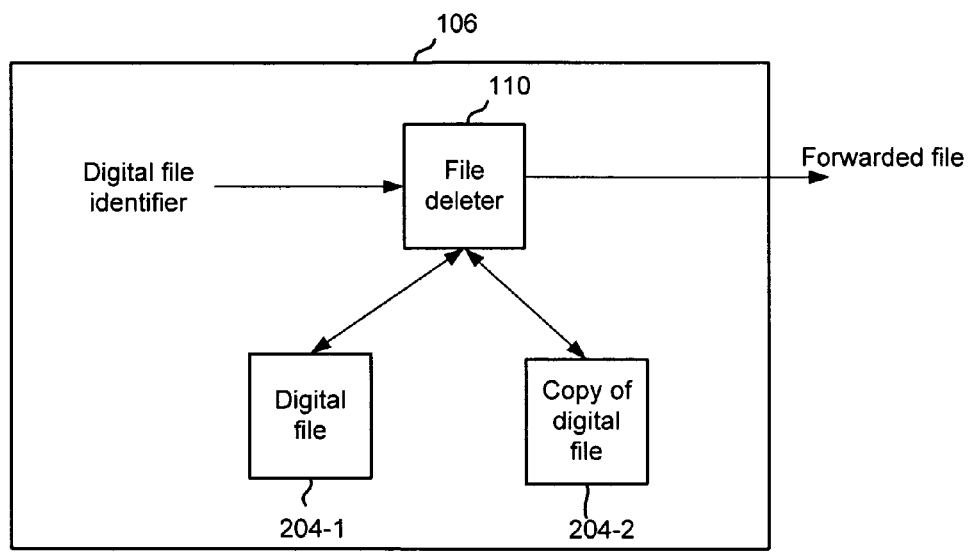
FIG. 2 depicts a more detailed example of a client seller according to one embodiment.

FIG. 2 depicts a more detailed example of client seller 106 according to one embodiment. As shown, a file deleter 110 has been downloaded to client seller 106. When the transfer of a digital file is desired, an input from a user specifying a digital file identifier for the digital file is received. For example, a user may use an interface to select a digital file that the user wants to sell. The identifier may be file path name to where the digital file is stored.

File deleter 110 may then search storage for client seller 106 to determine any other instances of the digital file. If any of these instances are found, file deleter 110 deletes them. In one example, file deleter 110 scans for copies of the digital file on all accessible storage drives present in client seller 106. In one embodiment, all digital files in client seller 106 are scanned. Before the sale, a registry with a hash code as a key and a file location as a value is created for all digital files found in client seller 106. The hash code may be a message-digest algorithm 5 (MD5) hash that also may be known as a checksum or fingerprint for the digital file. The MD5 hash code may be a 128-bit value. Accordingly, characteristics of the digital file may be determined that allow a quick comparison to characteristics of other digital files to determine if a copy is found. When the digital file is to be forwarded, file deleter 110 calculates the hash code for the digital file. Then, the registry is searched to determine if there is a match in the hash codes for other digital files found in storage for client seller 106. If there are matches, then the files may be deleted. In one embodiment, a user may be prompted to determine if the files should be deleted. This may allow the user to either indicate that this is not a match of the digital file being transferred or may allow the user to back out of the transaction.

The registry may be maintained and updated as the user adds and deletes digital files. For example, when a user performs a copy operation on a digital file, the registry may be updated with a hash code and location for the copy of the digital file. This operation is triggered automatically. Also, a tag may be included in the copy of the digital file. The tag may be used to identify the digital file as a copy. If a user moves the digital file to another location, the tag may be detected and the registry is updated with the new location. Also, if the digital file is moved to storage on another device, the registry may be updated indicating a location on another device.

In another embodiment, a search of digital files may be performed. A digital file may have information in it that can be used to uniquely identify the file and its copies. For example, a file may have specific identifiers that cannot be changed. These identifiers may be determined for a digital file. Other digital files may be searched to determine if they include the identifiers. The copies are found when files are determined to include the identifiers.

In yet another embodiment, a digital file may be configured to record when copies of digital files are made. For example, a code may be set in a copied file that is unique to the copied file. That code is then recorded in the registry. Also, the digital file may record how many copies have been made. When sale of the digital file is desired, a search for the copy of the digital file with the code is performed. The copy needs to be found for a transfer to be authorized. The code may be a flag, some kind of identifier, etc.

As shown in FIG. 2, two instances 204-1 and 204-2 of the file may be found from searching client seller 106. Instance 204-1 may be the original digital file and instance 204-2 may be a copy that was made. Any of the methods may be used to identify the two copies of the digital file. The search may be performed on one device, such as a personal computer, or on multiple devices, etc. In one example, a personal computer, external storage, and a music player may be searched. For example, the user may have downloaded a digital file to a portable player, such as a portable music player. Digital file deleter 110 may cause deletion of the digital file when the portable player is connected to client seller 106. For example, if software is used to organize the digital files on the portable player when it is synced with client seller 106, the software may delete the digital file upon the next syncing process.

An instance 204-1 may correspond to the digital file identifier, that is, the digital file identifier identifies a storage location in which the digital file can be found. Digital file 204-2 may be a copy of digital file 204-1. File deleter 110 then transfers a forwarded file 204-1 to secondary sale facilitator 102 and/or client buyer 108. Before, after, or during the transfer, file deleter 110 deletes file 204-1 and copy file 204-2 from client seller 106. Thus, the digital file purchased and any copies are deleted. File deleter 110 ensures that the user does not keep a copy of the digital file or the original digital file after the transfer has been performed (or substantially thereafter).

Referring back to FIG. 1, once the deletion of digital files is performed, client buyer 108 may download the digital file from secondary sale facilitator 102. Also, if the digital file is being transferred directly to client buyer 108, client buyer 108 may accept the transfer. Accordingly, a transfer of the digital file to a client buyer 108 in addition to a process that deletes the digital file and any other instances that may be stored at client seller 106 is provided.

Secondary sale facilitator 102 provides a marketplace to connect client sellers 106 and client buyers 108. Secondary sale facilitator 102 may charge a fee for the transfer of a digital file from client seller 106 and also for the download of the digital file at client buyer 108. Thus, both parties may be charged a fee. Also, client seller 106 may charge a fee to client buyer 108 to purchase the digital file. Electronic payment may be facilitated through secondary sale facilitator 102.

The terms and agreement of the secondary sale may be performed through the marketplace provided by secondary sale facilitator 102. The price may be determined by a set price, an auction, or any other methods.

In one embodiment, a web page is provided in which client sellers 106 may list digital files that users want to sell. Buyers may then search these digital files and indicate which digital files they want to purchase. Once a buyer and seller agree to a transaction (e.g., a price), file deleter 110 may facilitate transfer of the digital file as discussed above. Secondary sale facilitator 102 may provide a site that allows these connections.

Secondary sale facilitator 102 may also be used to as a primary seller 104. Thus, secondary sale facilitator 102 can configure digital files that are purchased new with the methods that can be used to search for copies that are made. For example, digital rights management is configured to interact with file deleter 110. When copies are made, the number of copies is kept track of in the registry. File deleter 110 then can use the registry to efficiently delete the files.

Figure 3:
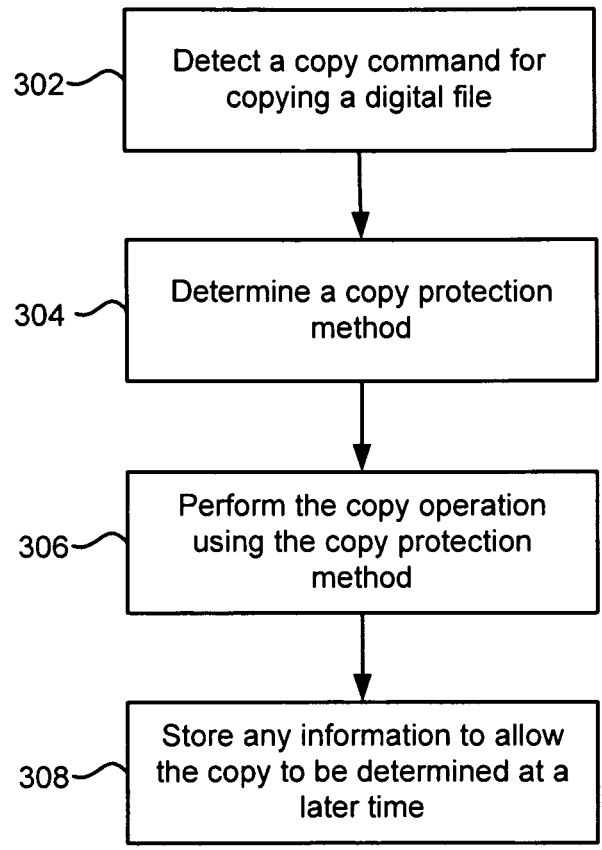
FIG. 3 depicts a method for tracking copies of digital files according to one embodiment.

FIG. 3 depicts a method for tracking copies of digital files according to one embodiment. Step 302 detects a copy command for copying a digital file. The command may be detected from another application that is used to copy files. Also, specialized software that is used to record instances of digital files that are being tracked may be used to perform the copy operations.

Step 304 determines a copy protection method. For example, copy protection methods keep track of the copies that are made. The location of the copy may be stored in a registry with an identifier, information may be stored in the copy to allow it to be uniquely identified, etc.

Step 306 performs the copy operation based on the copy protection method. The copy is generated and information is generated to allow the copy to be tracked. Step 308 then stores any information to allow the copy to be determined at a later time.

Figure 4:
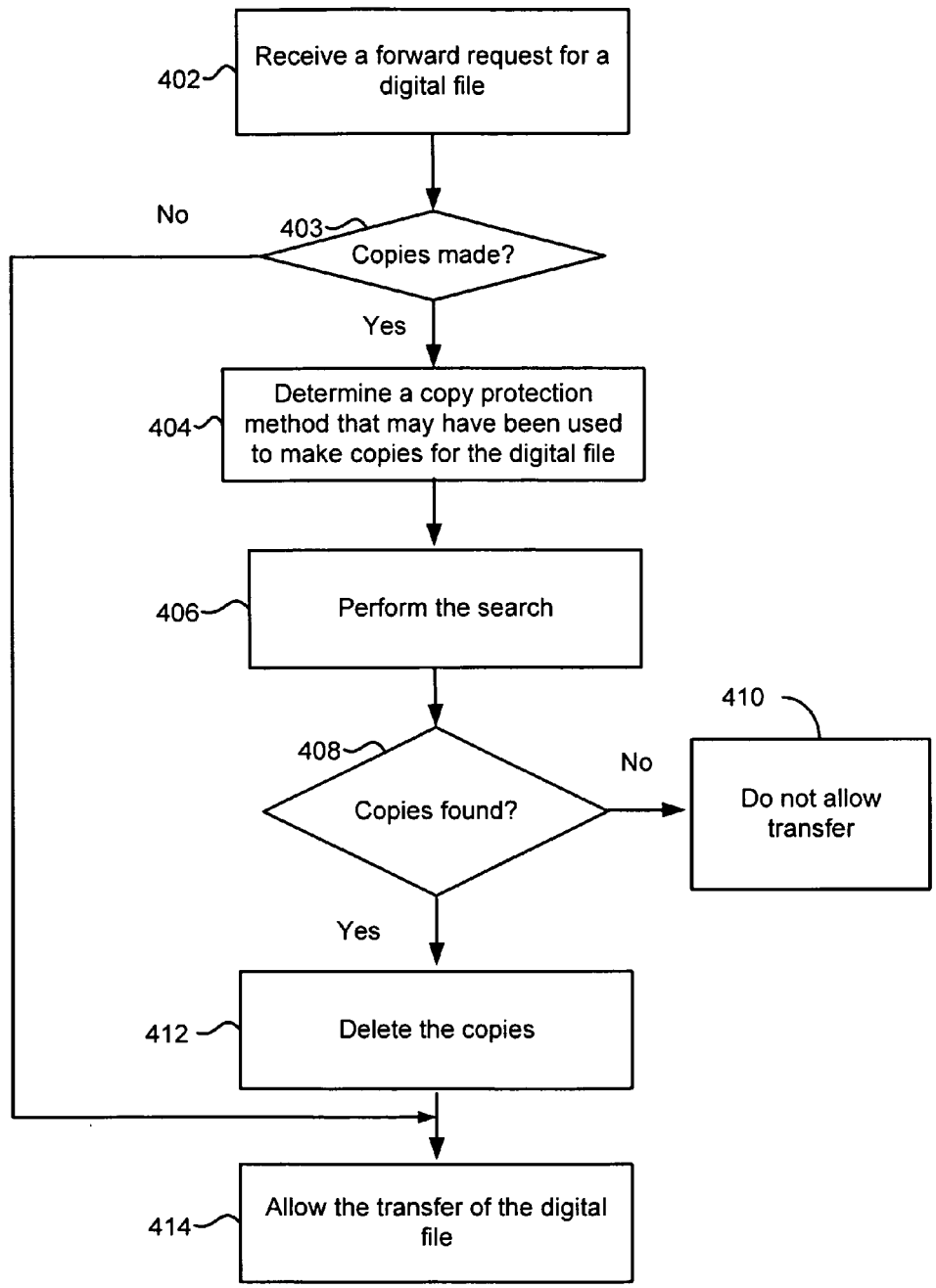
FIG. 4 depicts a method for searching for and deleting files according to one embodiment.

FIG. 4 depicts a method for searching for and deleting files according to one embodiment. Step 402 receives a forward request for a digital file. A user may want to sell a digital file to another user in this case.

Step 403 determines if any copies of the digital file were made. For example, information in the file that is going to be transferred may indicate a number of copies that were made If no copies were made, then the process proceeds to step 414 where the file transfer is allowed.

If copies were made (or if it cannot be determined if any copies were made 0 in which case a search is performed), step 404 determines a copy protection method that may have been used to make copies for the digital file. For example, a tiered search may be performed. First, information in the digital file may indicate whether the digital file has been copied or not. Second, a registry may be searched to determine if any copies had been made. Also, unique information in the digital file may be determined and used to search for copies.

Step 406 then performs the search. In some cases, file deleter 110 may know how many copies were made and searches for those copies. For example, it may be known two copies were made. Also, file deleter 110 may have unique information that allows it to identify any copies that were made. Further, a general search may be performed if the files cannot be uniquely identified. For example, some unique information in the file may be used to perform a general search of storage.

Step 408 determines if the copies of the digital file are found. If copies are not found, step 410 does not allow the transfer. For example, a message may be output indicating that the copies were not found and requests that a user provide the copies and indicate where they are stored. If the copies are found, step 412 deletes the copies. Step 414 then allows the transfer of the digital file.

Accordingly, particular embodiments provide a marketplace for selling used digital files. Conventionally, users were restricted from reselling any digital files that were purchased. However, by providing an application that deletes the digital file upon the transfer of the forwarded file and also searches for any other instances of the digital file, a delete and forward system is provided. Thus, the first sale doctrine may be adhered to.

Although the description has been described with respect to particular embodiments thereof, these particular embodiments are merely illustrative, and not restrictive. For example, although digital music may be described, other content may be transferred.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for providing transfer of digital files, the method comprising:
    downloading, by a computing device, an application;
    generating, by the computing device using the application, a plurality of hash codes each corresponding to one of a plurality of files stored on the computing device;
    storing, by the computing device using the application, each of the hash codes in association with a location of a corresponding one of the plurality of files in a registry;
    detecting, by the computing device using the application, creation of a copy of a first file of the plurality of files;

based on the detection, updating, by the computing device using the application, the registry by adding a first copy hash code and associated location of the copy of the first file in the registry;

based on the detection, adding, by the computing device using the application, a tag in the copy of the first file;

detecting, by the computing device using the application, movement of the copy of the first file to a new location by identifying the tag;

based on the detected movement, updating, by the computing device using the application, the registry by storing the new location in association with the first copy hash code;

receiving, by the computing device using the application, a request to sell the first file;

generating, by the computing device using the application, a first file hash code based on characteristics of the first file;

searching, by the computing device using the application, the registry for hash codes matching the first file hash code;

based on the search, determining, by the computing device using the application, a match between the first file hash code and the first copy hash code;

deleting, by the computing device using the application, the copy of the first file from the new location stored in association with the first copy hash code;

transferring, by the computing device using the application, the first file to a second entity; and deleting, by the computing device using the application, the first file.

2. The method of claim 1, wherein transferring the first file to the second entity comprises transferring the first file to a secondary sale facilitator from which the application is downloaded.

3. The method of claim 2, wherein the secondary sale facilitator transfers the first file to a buyer.

4. The method of claim 1, wherein transferring the first file to the second entity comprises transferring the first file to a buyer that is purchasing the first file.

5. The method of claim 1, wherein the first copy hash code is determined using unique information in the copy of the first file that cannot be changed.

6. The method of claim 1, further comprising recording a number of copies of the file that have been generated in the registry.

7. The method of claim 6, wherein deleting the copy of the first file comprises deleting the number of copies of the first file and not transferring the first file until the number of the copies of the first file have been deleted.

8. A non-transitory computer-readable storage medium containing instructions configured to provide transfer of digital files, the instructions, when executed by a computer system, cause the computer system to perform:

downloading an application;

generating, using the application, a plurality of hash codes each corresponding to one of a plurality of files stored on the computer system;

storing, using the application, each of the hash codes in association with a location of a corresponding one of the plurality of files in a registry;

detecting, using the application, creation of a copy of a first file of the plurality of files;

based on the detection, updating, using the application, the registry by adding a first copy hash code and associated location of the copy of the first file in the registry;

based on the detection, adding, using the application, a tag in the copy of the first file;

detecting, using the application, movement of the copy of the first file to a new location by identifying the tag;

based on the detected movement, updating, using the application, the registry by storing the new location in association with the first copy hash code;

receiving, using the application, a request to sell the first file;

generating, using the application, a first file hash code based on characteristics of the first file;

searching, using the application, the registry for hash codes matching the first file hash code;

based on the search, determining, using the application, a match between the first file hash code and the first copy hash code;

deleting, using the application, the copy of the first file from the new location stored in association with the first copy hash code;

transferring, using the application, the first file to a second entity; and deleting, using the application, the first file.

9. The non-transitory computer-readable storage medium of claim 8, wherein transferring the first file to the second entity comprises transferring the first file to a secondary sale facilitator from which the application is downloaded.

10. The non-transitory computer-readable storage medium of claim 8, wherein transferring the first file to the second entity comprises transferring the first file to a buyer that is purchasing the first file.

11. The non-transitory computer-readable storage medium of claim 8, wherein the first copy hash code is determined using unique information in the copy of the first file that cannot be changed.

12. The non-transitory computer-readable storage medium of claim 8, wherein the instructions cause the computer system to further perform recording a number of copies of the first file that have been generated in the registry.

13. The non-transitory computer-readable storage medium of claim 12, wherein deleting the copy of the first file comprises deleting the number of copies of the first file and not transferring the first file until the number of the copies of the first file have been deleted.

14. An apparatus configured to provide transfer of digital files comprising:

one or more computer processors; and a non-transitory computer-readable storage medium comprising instructions, that when executed by the one or more computer processors, cause the one or more computer processors perform:

downloading an application;

generating, using the application, a plurality of hash codes each corresponding to one of a plurality of files stored on the apparatus:

storing, using the application, each of the hash codes in association with a location of a corresponding one of the plurality of files in a registry;

detecting, using the application, creation of a copy of a first file of the plurality of files;

based on the detection, updating, using the application, the registry by adding a first copy hash code and associated location of the copy of the first file in the registry;

based on the detection, adding, using the application, a tag in the copy of the first file;

detecting, using the application, movement of the copy of the first file to a new location by identifying the tag;

based on the detected movement, updating, using the application, the registry by storing the new location in association with the first copy hash code:

receiving, using the application, a request to sell the first file;

generating, using the application, a first file hash code based on characteristics of the first file;

searching, using the application, the registry for hash codes matching the first file hash code;

based on the search, determining, using the application, a match between the first file hash code and the first copy hash code;

deleting, using the application, the copy of the first file from the new location stored in association with the first copy hash code;

transferring, using the application, the first file to a second entity; and deleting, using the application, the first file.

15. The method of claim 1, further comprising:

storing unique tracking information in the copy of the first file for tracking the copy of the first file when the copy of the first file is created;

ensuring the copy of the first file is deleted based on the respective unique tracking information for the copy of the first file, wherein the transfer of the first file to the second entity is not allowed until the copy of the first file is deleted; and when the copy of the first file is deleted, allowing the transfer of the first file to the second entity.

16. The method of claim 15, further comprising:

determining a copy protection method that was used in tracking the copy of the first file; and using the copy protection method to search for the copy of the first file.

17. The method of claim 1, wherein when the copy of the first file is moved to a second device, the location of the copy of the first file is updated to indicate a storage location on the second device.

18. The non-transitory computer-readable storage medium of claim 8, wherein when the copy of the first file is moved to a second device, the location of the copy of the first file is updated to indicate a storage location on the second device.

19. The apparatus of claim 14, wherein when the copy of the first file is moved to a second device, the location of one of the copy of the first file is updated to indicate a storage location on the second device.

* * * * *